United States Patent [19]

Amos et al.

[11] 4,312,372
[45] Jan. 26, 1982

[54] FLUID HANDLING SYSTEMS AND MULTI-POSITIONABLE VALVE ARRANGEMENTS FOR USE THEREIN

[76] Inventors: Benton H. Amos, 2427 Vista Dr., Bellingham, Wash. 98225; William M. Wood, 231 N. State St., Bellingham, Wash. 98295

[21] Appl. No.: 124,069

[22] Filed: Feb. 25, 1980

Related U.S. Application Data

[63] Continuation-in-part of Ser. No. 40,145, May 18, 1979, abandoned.

[51] Int. Cl.³ .................. F16K 11/02; F16K 11/22
[52] U.S. Cl. ......................... 137/266; 137/549;
137/625.19; 137/625.23; 137/625.47; 280/5 R;
123/41.42; 440/3
[58] Field of Search ............. 137/255, 263, 266, 267,
137/549, 340, 625.18, 625.19, 625.22, 625.23,
625.41, 625.42, 625.46, 625.47, 625.29, 567, 571;
280/5 R, 5 A; 244/135 R; 180/314; 123/32 J,
41.31, 41.34, 41.4, 41.41, 41.42; 440/3; 91/470;
60/698

[56] References Cited

U.S. PATENT DOCUMENTS

| | | | |
|---|---|---|---|
| 1,282,650 | 10/1918 | Stoddard | 123/555 X |
| 2,220,479 | 11/1940 | DeBell | 137/625.23 X |
| 2,332,882 | 10/1943 | Abbatiello | 137/625.29 X |
| 2,356,786 | 8/1944 | Harman et al. | 244/135 |
| 2,608,988 | 9/1952 | Ziegler | 137/267 X |
| 2,733,731 | 2/1956 | Torak | 137/625.42 X |
| 3,288,238 | 11/1966 | Lindsey | 137/567 X |
| 3,612,012 | 10/1971 | Dreisin | 123/41.31 |
| 3,910,301 | 10/1975 | Kuss | 137/549 X |

Primary Examiner—William R. Cline
Attorney, Agent, or Firm—Hughes, Barnard & Cassidy

[57] ABSTRACT

A fluid handling system and multi-positionable valving arrangement for use therein wherein a plurality of fluid source means such, for example, as a plurality of fuel tanks or the like, are adapted to be interconnected with a plurality of fluid utilization means such, for example, as a plurality of diesel engines or the like, in such a manner that fluid contained in a selected one or ones of the plurality of fluid source means can be directed to all or selected ones of the plurality of fluid utilization means, and wherein excess fluid which is unused by the fluid utilization means can be returned to the particular source means from which it was supplied or, in certain instances, can be returned to fluid source means other than that from which it was supplied. Various embodiments of the invention are illustrated and described, generally in connection with fluid handling systems of the types employed on marine vessels or the like where the invention finds particularly advantageous, but not necessarily exclusive, use. In the various embodiments of the invention illustrated it is possible to incorporate both the fuel delivery and fuel return functions in a single valve having one or two selectively positionable control element(s) or, alternatively, to provide two identical valves which respectively function to deliver fluid to, and return fluid from, the plurality of fluid utilization means.

37 Claims, 25 Drawing Figures

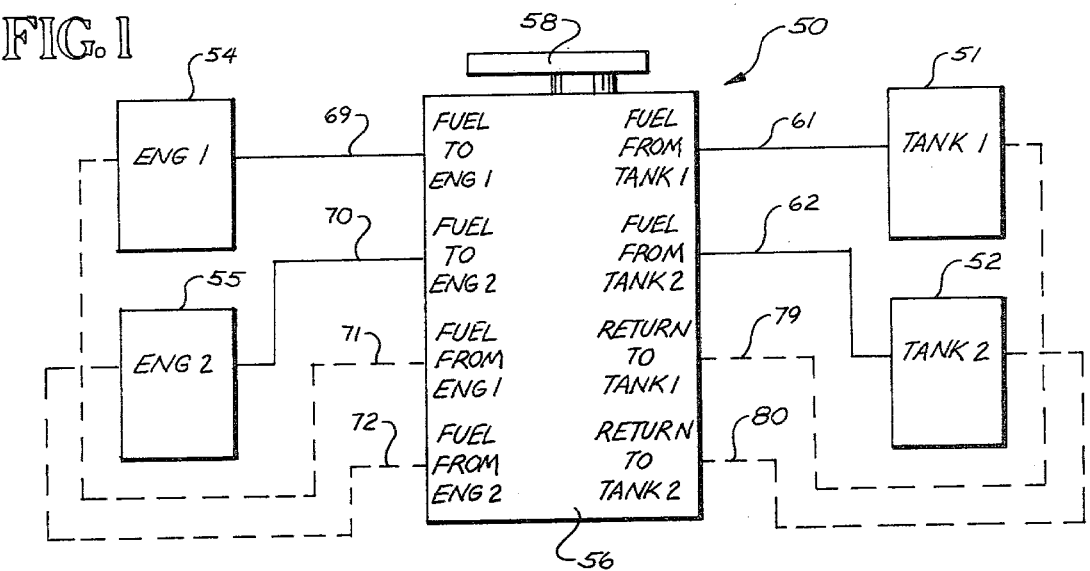
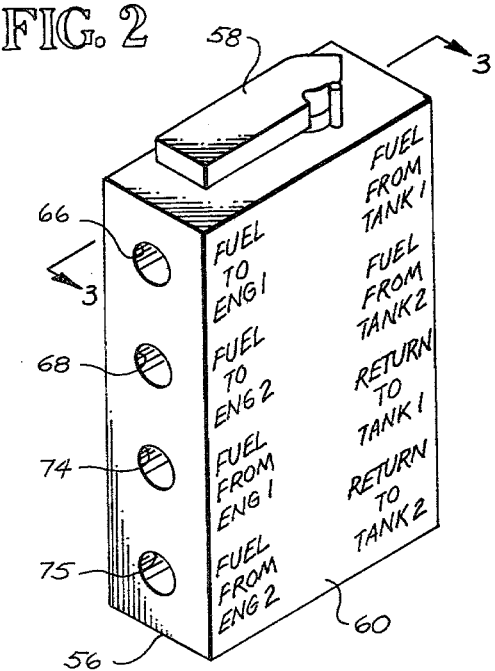
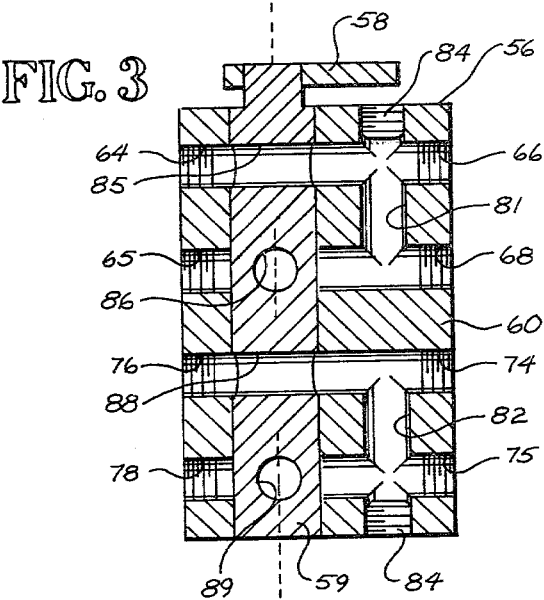

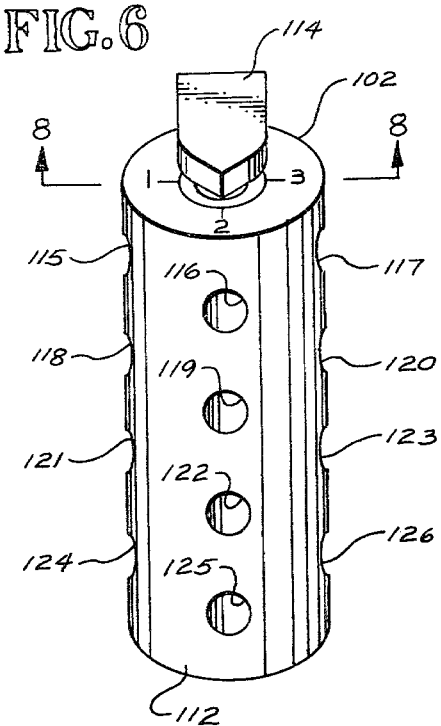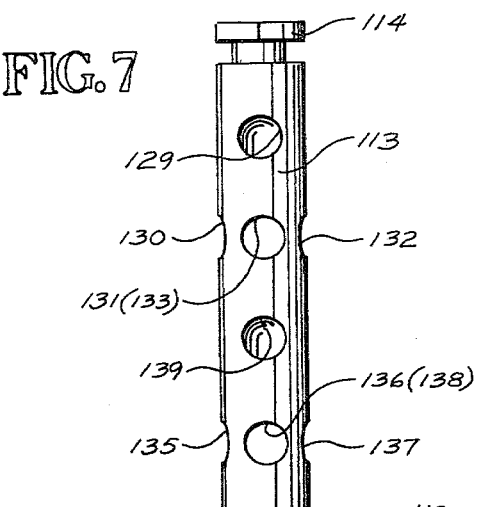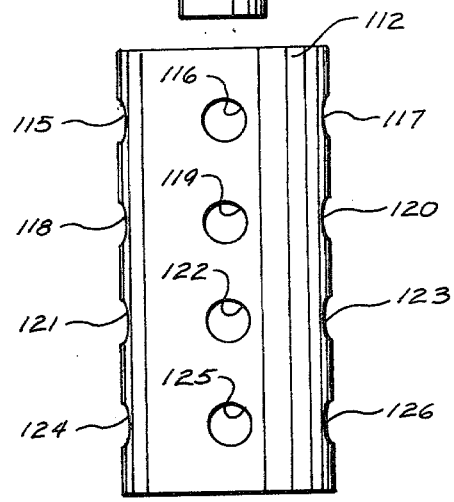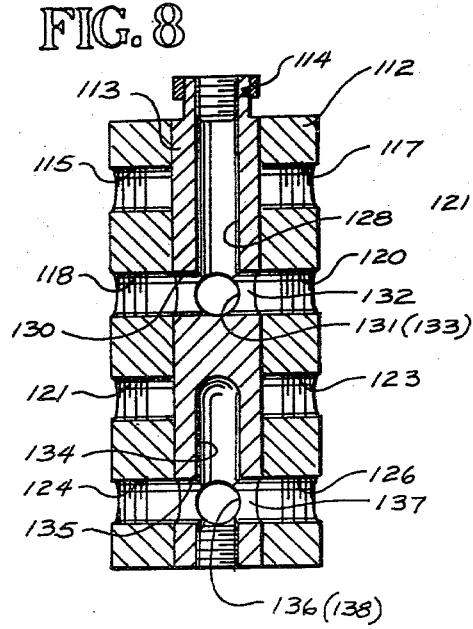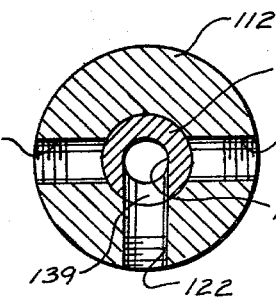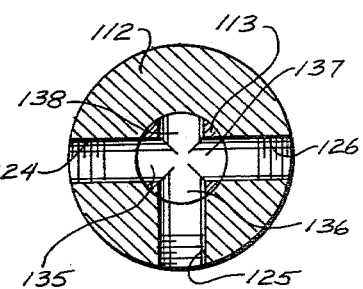
FIG. 6   FIG. 7   FIG. 8   FIG. 9   FIG. 10

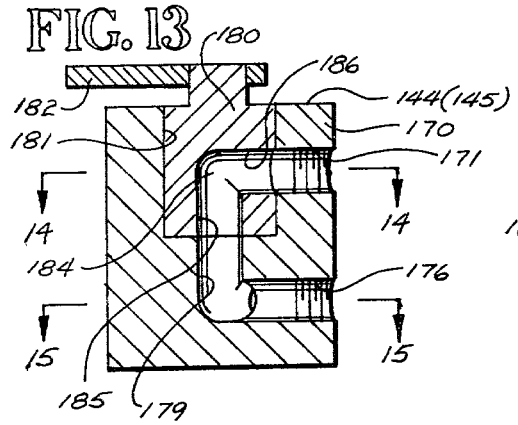
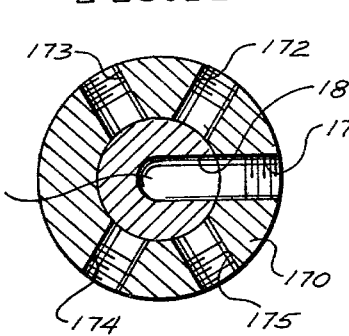
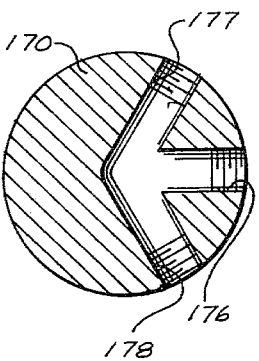
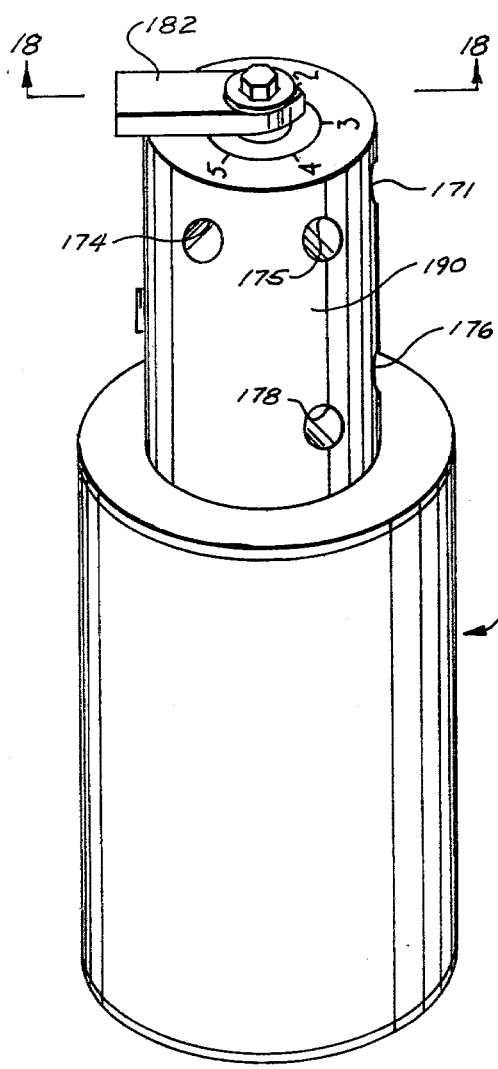
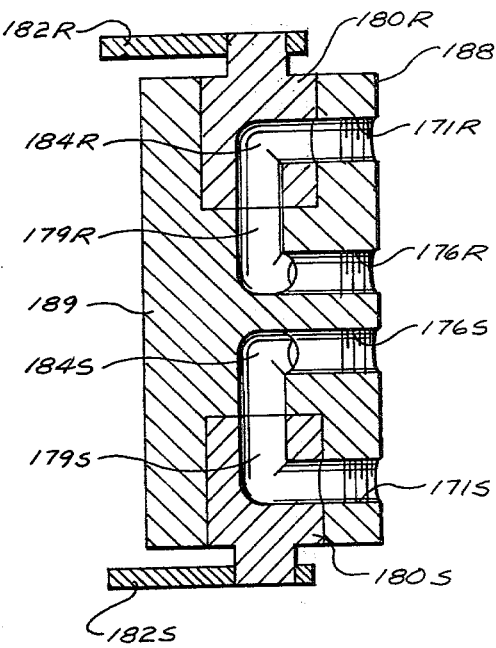

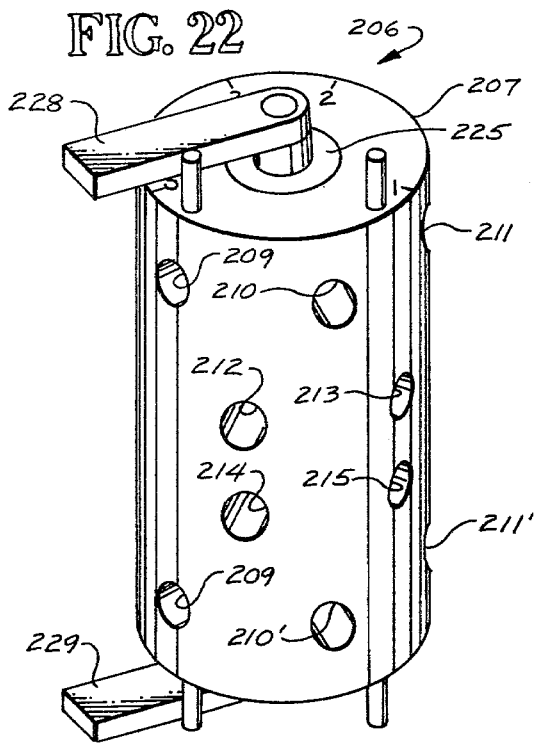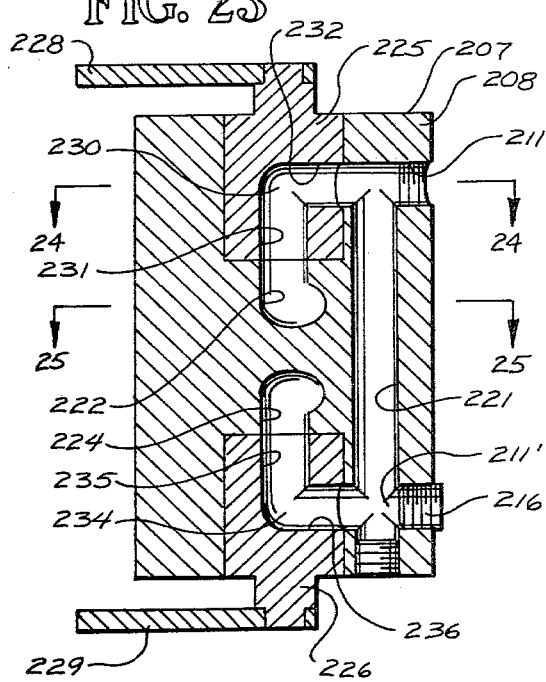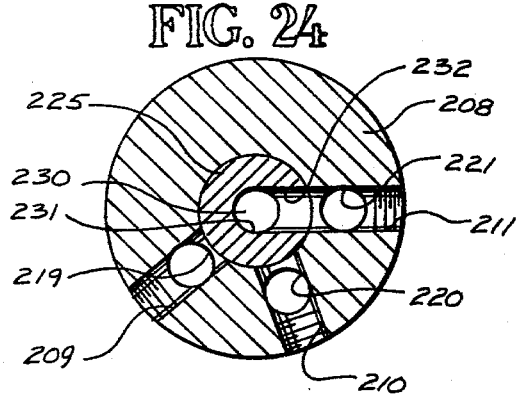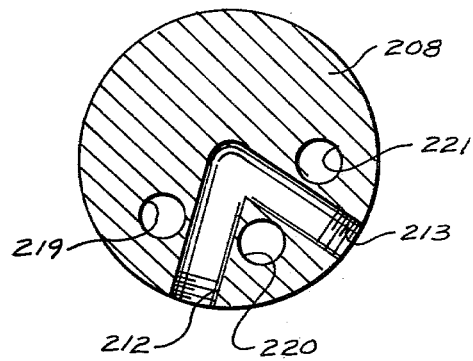

FLUID HANDLING SYSTEMS AND MULTI-POSITIONABLE VALVE ARRANGEMENTS FOR USE THEREIN

RELATED APPLICATIONS

This application is a continuation-in-part of our co-pending U.S. patent application Ser. No. 40,145, filed May 18, 1979, for "Multipositioned Valve", now abandoned.

This application is related to the copending United States patent application of Eivind Clausen, Benton H. Amos, and William M. Wood, Ser. No. 124,070, filed Feb. 23, 1980, "Improvements in Fluid Handling Systems and Multi-positionable Valving Arrangements for Use Therein" now U.S. Pat. No. 4,286,624, issued Sept. 1, 1981.

BACKGROUND OF THE INVENTION

The present invention relates in general to fluid handling systems and multi-positionable valving arrangements for use therein; and, more particularly, to fluid handling and valving systems of the type used to supply fluid from a selectible one or ones of n (where n is any whole integer greater than "1") fluid source means— e.g., n fuel tanks—to all or a selected one or ones of m (where m is any whole integer greater than "1") fluid utilization means—e.g., m diesel engines or the like— —and, for returning the excess or unused fluid supplied to the m utilization means to a selected one or ones of the n fluid source means. When the present invention is used to supply fuel from one of n fuel tanks to all or selected ones of m engines, the excess unused, or unburned, fuel supplied is commonly returned to the particular one of the n tanks from which it was supplied; but, in its broader aspects, the invention permits of return of excess unused fluid to a different selected tank or tanks in those instances where desirable.

While those skilled in the art will appreciate as the ensuing description proceeds that the present invention will find use in a wide range of fluid handling systems wherein there is a requirement to deliver fluid from a selected one or ones of a plurality of sources to all or a selected one or ones of a plurality of discrete utilization points, and to return excess or unused fluid from the plurality of discrete utilization points to a specific one or ones of the sources, the invention finds particularly advantageous use in those areas where a plurality of diesel fuel powered engines are utilized to provide motive power for, for example, marine vessels such as ships having multiple engines, large fishing or pleasure boats, tractor-trailer rigs hauling freight over highways, farm implements, passenger cars, and numerous industrial and/or process control applications.

Thus, it will be appreciated that the typical two-stroke diesel engine is an internal combustion power unit in which the heat of fuel is converted into work in the cylinder of the engine. In the diesel engine, air alone is compressed in the cylinder and, after the air has been compressed, a charge of diesel fuel is sprayed into the cylinder and ignition is accomplished by the heat of compression. Shortly before the piston reaches its highest position with the cylinder, the required amount of diesel fuel is sprayed into the combustion chamber by a fuel injector. The intense heat generated during compression of the air ignites the atomized fuel immediately. Because of the intense heat at or near the fuel injector, diesel engines may use portions of the diesel fuel itself to cool the fuel injector since, as fuel temperature increases, the performance of the engine is adversely affected. Surplus fuel which is used as a cooling agent is then returned to the fuel tank for subsequent use either as a cooling agent or as the source of motive power. Therefore, fuel lines and valving arrangements must be provided which serve not only to direct diesel fuel from the fuel tanks to the engines but, also, which serve to return unused fuel from the engines to the fuel tanks.

In many applications such, for example, as commercial fishing vessels or large pleasure boats, multiple fuel tanks may be utilized in conjunction with two or more engines. Such engines may function either as a source of motive power for the vessel or, alternatively, they may comprise one or more auxilliary engines which are utilized for purposes other than providing motive power for the vessel itself. Typically, all motive power engines and, perhaps one or more of the auxilliary engines as well, will be operating simultaneously and will be fed from the same fuel tank. As a particular fuel tank approaches or becomes empty, fuel must be directed to the engines from a second fuel tank. This process may be repeated a number of times depending upon the number of fuel tanks to be utilized.

So far as applicants are aware, conventional prior art fuel delivery systems require individual valves for controlling the fuel being delivered to each engine and the fuel returning from each engine. That is, in a system employing two tanks and two engines, four valves would normally be required—viz., a first valve for delivering fuel from tank No. 1 to both engines; a second valve for delivering fuel from tank No. 2 to both engines; and, third and fourth valves for returning unburned fuel to tank Nos. 1 and 2, respectively. The number of valves required is, of course, magnified where more than two tanks and/or engines are used. Because the valves associated with each fuel supply and fuel return line for each tank are typically arranged in close proximity to one another in order to reduce the time required to close one tank and open another tank, it is not an uncommon occurrence for one to activate the incorrect valves and, therefore, disrupt the flow of fuel to the engines. Alternatively, one may inadvertently close the valves associated with the nearly empty tank before opening the valves associated with the new tank. In either case, if the fuel lines to the engines are run dry, air will enter the lines and the engines will have to be primed in order to be restarted—a difficult and cumbersome process.

Other problems associated with multiple fuel tanks in a marine situation or with other moveable vehicles having multiple fuel tanks, involve the waste, potential environmental damage, and hazards resulting from spillage of fuel. For example, fishing vessels typically have at least two fuel tanks—one on either side of the hull—with a balancing line connecting the lower portions of the fuel tanks and which serves to maintain approximately equal fuel levels in each tank for purposes of balance. The tanks are also provided with an overflow port on an upper portion of the tank. Therefore, if a vessel having dual fuel tanks which are substantially full lists to one side for whatever reason (such as wind blowing broadside to the vessel), fuel will flow from the upper windward tank to the lower fuel tank through the balancing line; and, since the lower fuel tank is already full, fuel will be spilled through the overload port into the water. By the same token, a diesel powered truck having full fuel tanks and resting sidewise on a slope would experience the same problem. In either case, not only is there a substantial hazard due to the spilled fuel, but the environmental damage and economic waste is obvious.

In addition to the problems associated with known prior art designs, a typical vessel with two engines and four fuel tanks would have at least eight valves and more than thirty fittings. The costs of providing this large number of valves and fittings in a competitive situation are enormous.

The most pertinent prior art of which applicants are presently aware is that disclosed in Studdard U.S. Pat. No. 1,282,650 wherein the patentee discloses a valve permitting unidirectional movement between two object points. More specifically, the patentee discloses an elongated tapering rotary valve within a casing which may be moved between one of three positions. The rotary valve is provided with apertures or ports for communication with lines affixed to the casing. In a first position, all of the ports in the valve are closed except a single port which permits the flow of gasoline from a gasoline tank to an internal combustion engine. By rotating the valve member, the flow of gasoline is stopped and kerosene and water are permitted to flow through the valve to the engine, while exhaust gases will pass through the casing and valve to a muffler. In its third position, the valve closes all ports except one which permits the withdrawal of kerosene from the engine carburetor and its return to the kerosene tank.

Other prior art which has come to the attention of applicants includes the following: Ross et al U.S. Pat. No. 796,252 which discloses a conventional mixing faucet wherein two different liquids are mixed and discharged from a common outlet; Meldau U.S. Pat. No. 876,724 which discloses a stop-cock valve for permitting introduction of compressed air into beer kegs; Strother U.S. Pat. No. 1,501,146 which discloses a valve of the type used with an air brake for automobiles; Turak U.S. Pat. Nos. 2,733,730 and 2,733,731 which disclose a flow-controlled unidirectional dispensing valve used to mix soft drink syrups with carbonated water; Johnson U.S. Pat. No. 2,908,293 which discloses a unidirectional valve in which fluid is supplied through a single inlet and discharged through a selected one or ones of three discharge outlets and/or a bypass outlet; Sanders U.S. Pat. No. 3,319,531 which discloses an integrating valve for delivering hydraulic fluid under pressure to a plurality of cylinders in selected exact quantities; Baity U.S. Pat. No. 3,590,872 which discloses a disk-type unidirectional valve in which fluid from a single source may be delivered to a single point or to one of two points; and, Okadi U.S. Pat. No. 3,734,409 which discloses a mixing valve for mixing cold water and steam in a mixing chamber at given rates and delivering the hot water produced through a single outlet.

Because of the significant costs involved in providing the numbers of valves necessary in fuel supply systems heretofore in use, and because of the safety and environmental hazards incident to their use, there is, and has been, a continuing urgent requirement that a fluid supply system—especially, a fuel supply system—be provided which eliminates not only a large number of valves and fittings, but, which also reduces the chance of spillage of fuel or other fluids and/or the need to prime engines which have had their fuel supply cut off due to an inadvertent mistake by the operator.

SUMMARY OF THE INVENTION

Accordingly, it is a general aim of the present invention to provide a fluid handling system and valving arrangement for use therewith which are characterized by their simplicity, ease of operation, effectiveness and versatility, yet which overcome all of the foregoing disadvantages inherent in the prior art.

More specifically, it is an object of the present invention to provide fluid handling systems which permit of delivery of fluid—e.g., diesel fuel or the like—from any selected one or ones of a plurality of fluid sources to all or selected ones of a plurality of fluid utilization means—e.g., engines—and return of excess or unused fluid from the plurality of fluid utilization means to any selected one or ones of the plurality of sources.

In one of its more detailed aspects, it is an object of the invention to provide a fluid handling system and valving arrangement therefore in which the operator may readily, and virtually instantaneously, alter the operating condition of the system so as to supply fluids from a different source or sources to the pluralty of utilization means when the first source(s) is(are) depleted by the simple expedient of shifting only a single or, at most two, selector(s) from one position to another and wherein such action serves to simultaneously shut down supply of fluid from the depleted source and open up one or more new fluid sources for supplying fluid without disrupting fluid supplied to the plurality of utilization means and, at the same time, to permit return of unused or excess fluid from the utilization means to a selected one or ones of the fluid source(s) for subsequent use.

It is a further and more detailed objective of the invention to provide fluid handling and valving systems characterized by their versatility and which can be utilized to supply fluid from any selected one or more of a plurality of fluid sources to all or selected ones of a plurality of fluid utilization means and to return excess or unused fluids to a selected one or ones of the plurality of sources; yet, wherein the particular combination of operatively connected fluid source or sources and utilization means may be selectively altered on virtually an instantaneous basis without disrupting fluid flow to, or from, the operative utilization means.

An ancillary objective of the invention is to provide fluid handling systems of the foregoing type, and valving arrangements therefore, which, because of their versatility and simplicty of construction, permit a significant reduction in the number of valves and fittings heretofore required when dealing with fluid flow from selected ones of a plurality of sources to all or selected ones of a plurality of utilization points and return of excess or unused fluid to selected ones of the fluid sources, thereby providing significant cost reductions for the users of such systems.

DESCRIPTION OF THE DRAWINGS

These and other objects and advantages of the present invention will become more readily apparent upon reading the following detailed description and upon reference to the attaching drawings, in which:

FIG. 1 is a schematic view illustrating in diagrammatic fashion an exemplary fluid handling and valving system embodying features of the present invention—the system here being shown by way of example as a fuel system for supplying fuel to a pair of engines which may, merely by way of example, comprise diesel engines such as might be used in a boat, other marine vessel, or the like;

FIG. 2 is a perspective view of the valve shown diagrammatically in FIG. 1;

FIG. 3 is a vertical sectional view of the valve shown in FIGS. 1 and 2, here taken substantially along the line 3—3 in FIG. 2;

FIG. 6 is a perspective view of the valve shown diagrammatically in FIG. 5;

FIG. 7 is an exploded side elevational view of the valve illustrated in FIG. 6;

FIG. 8 is a vertical sectional view of the valve shown in FIGS. 5-7, here taken substantially along the line 8—8 in FIG. 6;

FIGS. 9 and 10 are cross-sectional views taken substantially along the lines 9—9 and 10—10, respectively, in FIG. 5;

FIG. 13 is a vertical sectional view of one of the two identical exemplary valves shown in FIG. 12;

FIGS. 14 and 15 are cross-sectional views taken substantially along the lines 14—14 and 15—15, respectively, in FIG. 13;

FIG. 16 is a vertical sectional view similar to FIG. 13, but here depicting a slightly modified form of the invention;

FIG. 17 is a perspective view of a valve similar to that shown in FIGS. 12-15, but here depicting the valve interconnected to a filtering system;

FIG. 22 is a perspective view of yet another valve embodying features of the present invention;

FIG. 23 is a vertical sectional view taken substantially along the line 23—23 in FIG. 22; and, FIGS. 24 and 25 are cross-sectional views taken substantially along the lines 24—24 and 25—25, respectively, in FIG. 23.

Figure 4:
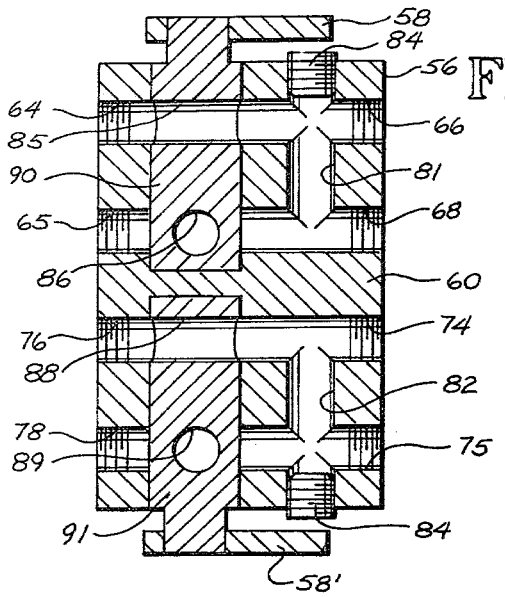
FIG. 4 is a vertical sectional view similar to FIG. 3, but here illustrating a slightly modified form of the invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Referring first to FIG. 1, there has been diagrammatically illustrated a fluid handling system and valving arrangement therefore, generally indicated at 50, embodying features of the present invention—the exemplary system 50 here comprising a fuel supply system of the type commonly employed for supplying fuel from one of n fuel tanks 51, 52 to all of m engines 54, 55 (here, both n and m are equal to "2"), and for returning the unburned fuel from both engines 54, 55 to the particular tank 51, 52 which supplied such fuel. As here shown, the exemplary system 50 includes a fuel distributing valve 56 having an operating lever or handle 58 affixed to valve control element means—which here takes the form of an elongate valve element 59 (FIG. 3) having a circular cross section—extending through valve housing means, here depicted as a rectangular-shaped housing 60. Those skilled in the art will, of course, appreciate that the housing 60 can be constructed in any desired shape such, for example, as circular. Fuel is delivered from a selected one of tanks 51, 52 via fuel supply lines 61, 62, respectively, to respective ones of a pair of fuel source supply inlet ports 64, 65 (FIG. 3) formed in valve housing 60. Fuel is delivered to the engines 54, 55 from a pair of fuel utilization supply outlet ports 66, 68 formed in housing 60 via fuel supply lines 69, 70, respectively.

To permit return of unburned fuel from the engines 54, 55, the engines are respectively coupled via fuel return lines 71, 72 to a pair of fuel utilization return inlet ports 74, 75 formed in valve housing 60 and which are adapted to be operatively connected to one of a pair of fuel source return outlet ports 76, 78 for return via one of fuel return lines 79, 80 to the particular one of fuel tanks 51, 52 which supplied such fuel initially.

As best illustrated in FIG. 3, it will be noted that the fuel utilization supply outlet ports 66, 68 are interconnected by means of a vertical (as viewed in FIG. 3) flow passage 81 formed in valve housing 60, while fuel utilization return inlet ports 74, 75 are similarly interconnected by means of a second vertical flow passage 82 in the valve housing 60. Of course, where the valve housing 60 is formed of multiple molded or cast components adapted to be secured together in fluid-tight sealed relation, the flow passages formed therein may be formed by the particular configuration of dies employed. Alternatively, where, as here, the valve housing 60 comprises a unitary piece of material, the inlet/outlet ports and passages may be formed by drilling or the like; and, preferably, the passages thus formed are internally threaded to permit attachment of fittings (not shown) for the fluid supply and return lines, as well as to permit closure of those openings utilized to form vertical passages 81, 82 by means of externally threaded plugs 84.

In accordance with one of the important aspects of the present invention, provision is made for selectively transferring the fluid supply and fluid return functions from one to the other of the fuel tanks when, for example, the fuel stored therein is depleted and the tank in use is approaching the empty condition; and, wherein such transfer occurs without disruption of the fuel supply to engines 54, 55. To accomplish this, selectively positionable valve element 59 is provided with four transverse passages—viz., two fluid supply passages 85, 86 respectively disposed at locations adapted to be registered with (i) fluid source inlet and outlet ports 64, 66 (passage 85) and (ii), fluid source inlet and outlet ports 65, 68 (passage 86); and, two fluid return passages 88, 89 respectively disposed at locations adapted to be operatively registered with (iii) fuel return inlet and outlet ports 74, 76 (passage 88), and (iv) fuel return inlet and outlet ports 75, 78 (passage 89). As will be apparent upon inspection of FIG. 3, the fluid supply passages 85, 86 are formed so as to extend at right angles to one another; as are the fluid return passages 88, 89.

Thus, the arrangement is such that when the valve control element 59 is positioned within the valve housing 60 as shown in FIG. 3, fuel supply passage 85 is aligned with, and forms a continuous uninterrupted fluid path between, fuel source inlet port 64 and fuel supply outlet port 66, thereby permitting flow of fuel from tank 51 to engine 54; and, since fuel supply outlet ports 66, 68 are interconnected by passage 81, also permitting fuel flow to engine 55. Fuel supply from tank 52 is effectively precluded by virtue of the fact that in this operating mode, fuel supply passage 86 is operatively disconnected from fuel supply inlet port 65. Similarly, in the operating position shown in FIG. 3, fuel return passage 88 serves to operatively connect both fuel utilization return inlet ports 74, 75 (the latter via passage 82) to fuel return outlet port 76, thereby permitting return of unburned fuel from both engines 51, 52 to fuel tank 51 via fuel return lines 71, 72 and 79 (FIG. 1). Return of fuel to tank 52 is effectively precluded because fuel return passage 89 in the valve control element means 59 is operatively disconnected from fuel return inlet port 78.

As a consequence of the foregoing construction, when the operator desires to change the source of fuel from tank 51 to tank 52—e.g., when tank 51 is approaching an empty condition or, when it is more empty than tank 52 and the operator desires to maintain the two tanks in approximately balanced condition—it is merely necessary to turn the operating handle or lever 58 so as to rotate valve element 59 about its longitudinal axis of rotation from the position shown in FIG. 3 to a position at right angles thereto, thereby disconnecting fluid supply and return passages 85, 88 from operative connection to tank 51 and, simultaneously, operatively connecting fluid supply and return passages 86, 89 to fuel source supply inlet and return outlet ports 65, 78 so as to operatively connect tank 52 to engines 54, 55 for both fuel supply and fuel return functions.

Referring to FIG. 4, there has been illustrated a slightly modified valve arrangement substantially identical to the form shown in FIG. 3, but which here permits excess unused fluids to be returned to either of tanks 51, 52 irrespective of which tank is supplying fluid and which tank is shut off. Upon comparison of the two valves depicted in FIGS. 3 and 4, it will be noted that such valves are substantially identical in all respects except, that in the form shown in FIG. 4, the valve control element means—viz., that portion of the valve corresponding to control element 59 in FIG. 3—comprises two separate, independent, coaxial control elements 90, 91 respectively having control levers or handles 58, 58', thereby permitting individual selective control of the fuel supply and fuel return portions of the system. Thus, referring to FIGS. 1 and 4 conjointly, it will be noted that with the valve control elements 90, 91 positioned as depicted, fuel is being supplied to both engines 54, 55 from tank 51 (FIG. 1) via supply line 61, inlet port 64, supply passage 85 in control element 90, outlet ports 66, 68, and supply line 69, 70. Similarly, excess or unburned fuel is being returned from both engines 54, 55 to tank 51 via return lines 71, 72, inlet ports 74, 75, return passage 88 in control element 91, outlet port 76 and return line 79.

When the fuel supply in tank 51 is depleted and the operator desires to switch over to tank 52 for continued supply, it is merely necessary to actuate operating lever 58 to rotate control element 90 about its axis of rotation through an angle of 90°, thereby operatively registering supply passage 86 with supply inlet port 65 and supply outlet ports 66, 68, while simultaneously terminating further fuel flow from tank 51 through inlet port 64 since supply passage 85 is no longer operatively connected to the inlet and outlet ports. Such action does not, however, serve to change the operating condition for flow of excess unburned fuel being returned to tank 51 via return passage 88 in control element 91. Consequently, in this condition fuel is supplied to both engines 54, 55 from tank 52, while excess unburned fuel is returned from both engines to tank 51. Such an arrangement is highly advantageous when it is desired to maintain, or re-attain, conditions of approximate balance of fuel between two separate tanks located, for example, on the port and starboard sides of a marine vessel.

Consideration of the two forms of the invention thus far described demonstrates that fluid handling and valving systems embodying the features of the present invention are highly versatile and permit ease of switching of the fluid supply and fluid return functions of the system either independently or in unison, thereby permitting fluid to be transferred from either of two fluid supply points to both of two fluid utilization points with excess unused fluid being returned from both utilization points to either supply point, all with the use of a single valve having either one or two control elements and selector handles. However, the present invention is not limited to use with two fluid sources and two fluid utilization means.

Figure 5:
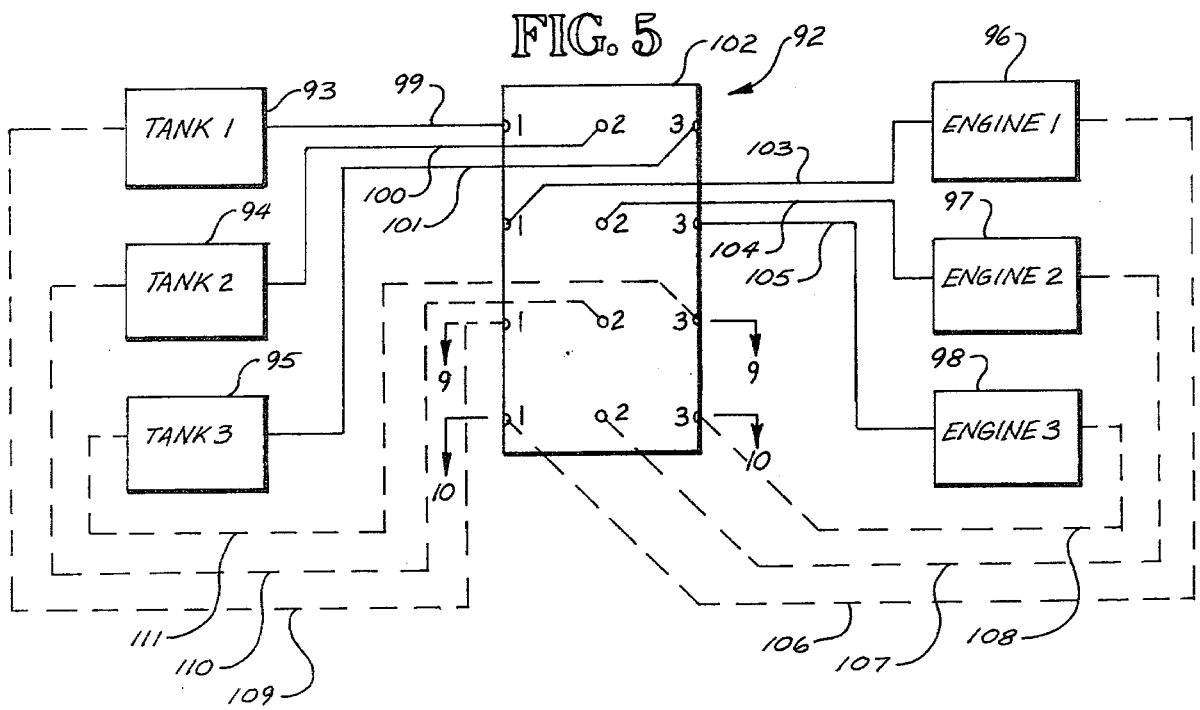
FIG. 5 is a schematic view illustrating in diagrammatic fashion a modified fluid handling and valving system also embodying features of the present invention—the exemplary system here being shown as suitable for supplying fuel to, and returning fuel from, three engines.

Thus, referring to FIG. 5, there has been illustrated a further exemplary embodiment of the invention wherein a fluid handling system 92 is provided in which fluid—e.g., diesel fuel—may be transferred from a selected one of three tanks 93, 94, 95 to all of three engines 96, 97, 98 via fuel supply lines 99, 100, 101 respectively associated with the tanks 93–95, valve 102, and fuel supply lines 103, 104, 105 respectively associated with the engines 96–98. Excess unburned fuel is returned from the engines 96–98 via return fuel lines 106, 107, 108, respectively, valve 102, and fuel return lines 109, 110, 111 respectively associated with tanks 93–95. Consequently, as here depicted the n fluid source means and m fluid utilization means are each three in number; yet, only one valve 102 is required.

Considering FIGS. 5–10 conjointly, it will be noted that valve 102 is provided with an elongate cylindrical valve housing 112 having coaxial valve control element means extending longitudinally therethrough, such control element means here comprising a circular rod-like valve element 113 having an operating lever or handle 114 affixed thereto and being mounted within housing 112 for rotation about its vertical axis. Valve housing 112 is provided with n (where n is equal to "3") fuel supply inlet ports 115, 116, 117 adapted to be respectively connected to tanks 93–95 via fuel supply lines 99–101; m (where m is equal to "3") fuel supply outlet ports 118, 119, 120 adapted to be respectively coupled to engines 96–98 via fuel supply lines 103–105; m fuel return inlet ports 121, 122, 123 adapted to be respectively connected to fuel return lines 106–108 associated with respective different ones of engines 96–98; and, n fuel return outlet ports 124, 125, 126 adapted to be respectively coupled to fuel return lines 109–111 associated with respective different ones of the n tanks 93–95.

In carrying out the present invention, the exemplary valve control element 113 is provided with a central longitudinal or axial fluid supply passage 128 (FIG. 8) having a single inlet port 129 (FIG. 7) for operative registration with one only of fuel supply inlet ports 115–117, and four outlet ports 130, 131, 132, 133 (see, e.g., FIGS. 7 and 8 where outlet port 133 is located on the back side of the valve control element and, consequently, is not visible), any three of which may be operatively registered with the three fuel supply outlet ports 118–120. Thus, the arrangement is such that when valve control element 113 is in the position shown in FIGS. 6–8, fuel is supplied to all three engines 96–98 (FIG. 5) from tank 94 via a fuel supply path extending through supply line 99, inlet port 116 in housing 112, inlet port 129 in control element 113, fuel supply passage 128, fuel outlet ports 130–132 in control element 113 which are respectively registered with fuel outlet ports 118–120 in valve housing 112, and fuel supply lines 103–105 (FIG. 5). Rotation of the control element 113 (e.g., clockwise as viewed in FIG. 6) from the position shown through an angle of 90° to a position where fuel inlet ports 115 in housing 112 and 129 in control element 113 are in fluid communicating registration, serves to operatively connect fuel tank 93 (FIG. 5) to all three engines 96–98 since, in this position, outlet ports 131–133 in control element 113 are operatively registered with fuel supply outlet ports 118–120, respectively, in housing 112. Similarly, rotation of control element 113 through a 90° angle in a counterclockwise direction as viewed in FIG. 6 serves to operatively connect tank 95 with all three engines 96–98 (FIG. 5).

To permit return of unused fluid—e.g., unburned fuel when the invention is employed in conjunction with a fuel handling system—valve control element 113 is further provided with an axially extending fluid return passage 134 (FIGS. 8 and 9), four fuel return inlets 135, 136, 137, 138 (FIGS. 7, 8 and 10), any three of which are adapted to be operatively registered with fuel return inlets 124, 125, 126 in valve housing 112, and a single fuel return outlet 139 (FIGS. 7-9) which is positioned for operative registeration with one only of fuel return outlets 121–123 in valve housing 112. In the exemplary valve as here depicted, it will be understood that the arrangement and configuration of fuel return ports 135–139 and return passage 134, are identical to that for fuel supply ports 129–133 and supply passage 128; and, consequently, the operational description set forth above for supplying fuel from any one of tanks 93–95 to all of engines 96–98 is equally applicable to the return of fuel from all of engines 96–98 to any one of tanks 93–95 except, that the direction of flow is reversed through fluid return lines 106–108, fuel return ports 124–126, three of the four ports 135–138 in control element 113, return port 134, outlet port 139, one only of return outlet ports 121–123 in housing 112, and one of the fuel return lines 109–111. In the position illustrated in the drawings, fuel is supplied from tank 94 to all engines 96–98, with excess unburned fuel being returned to the supplying tank 94; and, rotation of the control element 113 in one direction or the other serves to shift fuel supply and return from tank 94 to either tank 93 or tank 95.

Figure 11:
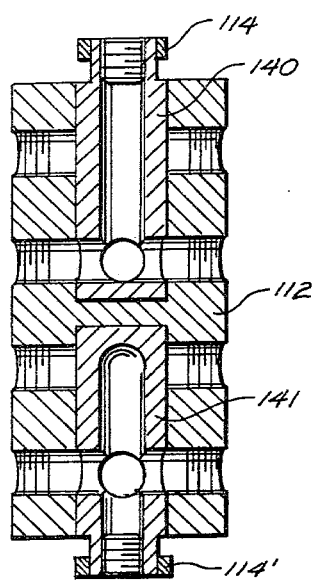
FIG. 11 is a vertical sectional view similar to FIG. 8, but here illustrating a slightly modified form of the invention.

As with the form of the invention illustrated in FIGS. 1–3, the exemplary fluid handling and valving system depicted in FIGS. 5–10 also readily permits of modification so that with a single valve, fluid can be supplied from any one of three tanks 93–95 to all three engines 96–98, with excess unused fluid being returned from all engines to either the supplying tank or, alternatively, to one of the other two tanks. Such an arrangement is illustrated in FIG. 11 wherein a valve housing 112 substantially identical in all respects to that shown in FIG. 8 is provided with two coaxial control elements 140, 142 respectively having operating levers or handles 114, 114' associated therewith. Consequently, valve control element 140 which serves to supply fluid from any one of three sources to all of three utilization points can be operated independently from valve control element 141 which serves to return unused fluid from all three utilization points to any one of the three sources, all with the use of only a single valve.

Thus far, the invention has been described in connection with fluid handling and valving systems employing only a single valve for distributing fluid from one of a plurality of sources to all of a plurality of utilization points, with excess fluid being returned from all utilization points to either the supplying source or, alternatively, to one of the other sources. In FIGS. 3 and 8, for example, the single valves depicted employ a unitary control element which serves to control both fuel supply and fuel return functions; whereas in FIGS. 4 and 11, a single valve is provided with two independently operable control elements—one to control fluid supply and the other to control fluid return. It will be evident to those skilled in the art that the exemplary valve means shown in FIGS. 4 and 11 can include a unitary housing as shown in the drawings or, alternatively, the valve means could be readily sub-divided into two separate valve housings—viz., one housing containing the fuel supply control element and the other containing the fuel return control element.

Figure 12:
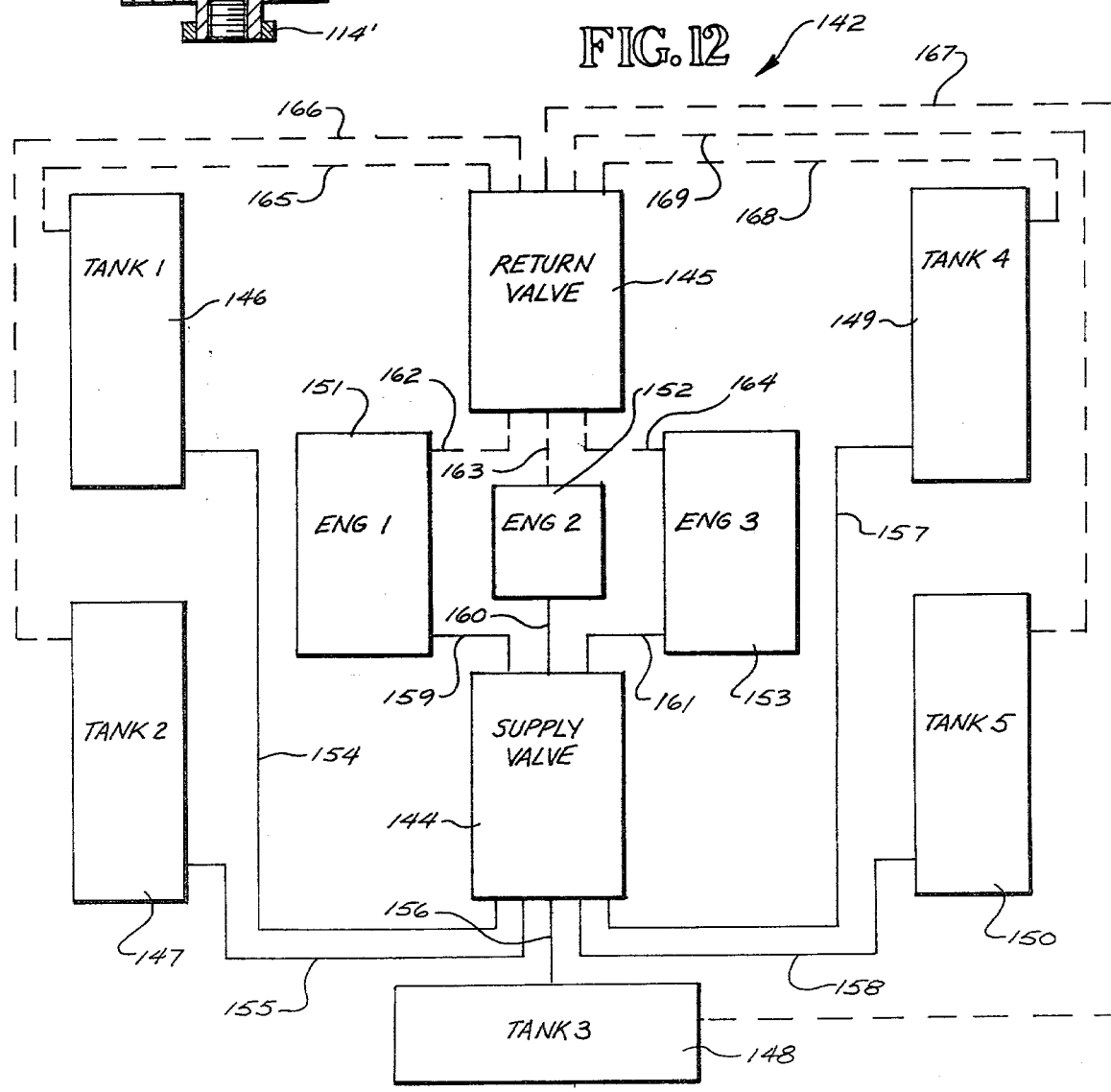
FIG. 12 is a schematic view illustrating in diagrammatic fashion yet another modified fluid handling and valving system embodying features of the present invention—the system here being suitable for transferring fluids between, e.g., selected ones of five fuel tanks and three engines.

Such an arrangement has been illustrated in FIG. 12 wherein an exemplary fluid handling and valving system 142 has been depicted having a fuel supply valve 144 and a separate, independent fluid return valve 145; such supply and return valves 144, 145 being identical in construction. Supply valve 144 is utilized to distribute, for example, fuel from any one of n fuel tanks (here, n is equal to five tanks 146–150, but those skilled in the art will appreciate that more or fewer tanks could be utilized if desired) to all of m engines (m is here equal to three engines 151–153 but, again, more or fewer than three engines could be employed if desired) via valve supply lines 154–158 and engine supply lines 159–161, respectively. Similarly, return valve 145 receives unused fuel from all three engines 151–153 via return lines 162–164, and serves to distribute such unused fuel to any selected one of tanks 146–150 via a selected one of five return lines 165–169 associated with respective different ones of tanks 146–150.

Since supply valve 144 and return valve 145 are identical in construction, it will suffice to describe the construction and mode of operation of only one of the valves—it being understood that such description will be equally applicable to the other except that reference to "inlet" and "outlet" ports are reversed. That is, what is described as a fuel inlet port in supply valve 144 is, in actuality, a fuel outlet port in return valve 145.

With the foregoing in mind, upon reference to FIGS. 13–15 conjointly, it will be noted that the valve (which, for convenience, will here be referred to as supply valve 144) comprises a housing 170 having five radially disposed inlet ports 171-175 at one level, and three radially disposed fuel outlet ports 176-178 at a second level. Of course, where the fuel handling and valving system is to be used in conjunction with other than five fuel sources and/or three utilization points, the number of inlet and outlet ports employed would be adjusted accordingly—indeed, the valve as depicted could be used with fewer than the five tanks illustrated and/or fewer than the three engines illustrated by the simple expedient of plugging one or more of the inlet and/or outlet ports therein. As illustrated in FIGS. 13 and 15, the three radially disposed outlet ports 176-178 merge at their inner extremities where they are coupled to an axially extending flow passage 179 formed in housing 170.

In keeping with the present invention, provision is made for selectively coupling one of the five radial fuel inlet ports 171-175 to the axial flow passage 179 and, therefore, to all of the fuel outlet ports 176-178 so as to permit distribution of fuel from any one of the five fuel sources 146-150 (FIG. 12) through one of inlet ports 171-175, fluid passage 179, and all of fluid outlet ports 176-180, from which point the fuel is distributed via supply lines 159-161 to all three engines 151-153. To accomplish this, the valve 144 is provided with a rod-like control element 180 having a circular cross-section and seated in an axial bore 181 formed in valve housing 170; such control element being adapted for rotation about its axis by means of an operating lever or handle 182. Control element 180 is provided with an L-shaped flow passage 184 having an axial leg 185 in fluid communication with fluid passage 179 and a radial leg 186 adapted to be aligned in fluid communicating registration with any selected one of the five radial inlet ports 171-175 in housing 170. The arrangement is such that in the position shown in the drawings, fuel is transferred to all three engines 151-153 (FIG. 12) from fuel tank 146 via supply line 154, inlet port 171 (FIGS. 13 and 14), passages 184 and 179, radial outlet ports 176-178, and supply lines 159-161 (FIG. 12).

It will be appreciated from the foregoing description that when the valve system illustrated in FIGS. 13-15 is being employed as a fluid return valve—i.e., the return valve 145 shown in FIG. 12—fluid flows therethrough in the reverse direction. Thus, in this exemplary case, unused fuel would be returned from all three engines 151-153 to tank 146 via return lines 162-164 (FIG. 12), radial ports 176-178 (FIGS. 13 and 15) which now function as inlet ports, passages 179 and 184, radial port 171, which now functions as an outlet port, and return lines 165. In either case, the operator may readily transfer the fuel supply function and/or the fuel return function from and to tank 146 to any selected one of tanks 147-150 by the simple expedient of actuating the operating lever 182 (FIG. 13) so as to rotate the control element 180 about its axis to align fluid passage 184 with a desired one of the remaining four radial ports 172-175; and, since separate, independently positionable, control elements 180 are provided for both the supply valve 144 and the return valve 145, fuel will be supplied from any one of the five tanks 146-150 to all engines 151-153, while excess unburned fuel will be returned from the three engines to either the supplying tank or to a selected one of the remaining four tanks.

Although the exemplary form of the invention shown in FIGS. 12-15 has been described in conjunction with two independent and separate supply and return valves 144, 145, such valves can be readily consolidated into a single valve without departing from the spirit and scope of the invention. Thus, referring to FIG. 16, there has been illustrated a single valve 188 having a unitary valve housing 189 which here serves both a fluid supply and fluid return function. Since the structural components employed for both the supply and return functions are identical to one another and to the exemplary valve shown in FIGS. 12 and 13 (except for the use of a unitary housing 189), identical reference numbers have been utilized in FIG. 16 with the addition of the designations "S" (to indicate supply) and "R" (to indicate return). Thus, as here shown the valve housing 189 is provided with: (i) a plurality of supply inlet ports (one of which is indicated at 171S); (ii) a plurality of supply outlet ports (one of which is indicated at 176S); (iii) a plurality of return inlet ports (one of which is indicated at 176R); and (iv), a plurality of return outlet ports (one of which is indicated at 171R). In operation, supply operating lever 182S is actuated to rotate supply control element 180S about its axis to position supply passage 179S in fluid communicating registration with one of the plurality of supply inlet ports (here port 171S) and, via passage 184S, with all of the plurality of supply outlet ports 176S, etc.—thereby permitting fluid to be supplied from a selected one of a plurality of fluid sources to all of a plurality of fluid utilization points. Unused fluid is returned from all utilization points via all fuel return inlet ports 176R, etc., and return passages 179R in housing 188 and 184R in control element 180R, to a single one of the plurality of return outlet ports (here port 171R), and then back to the supply source operatively connected to port 171R. Operation of return control lever 182R permits the operator to return unused fluid to any selected source independent of which source is operatively supplying the system with fluid.

Figure 18:
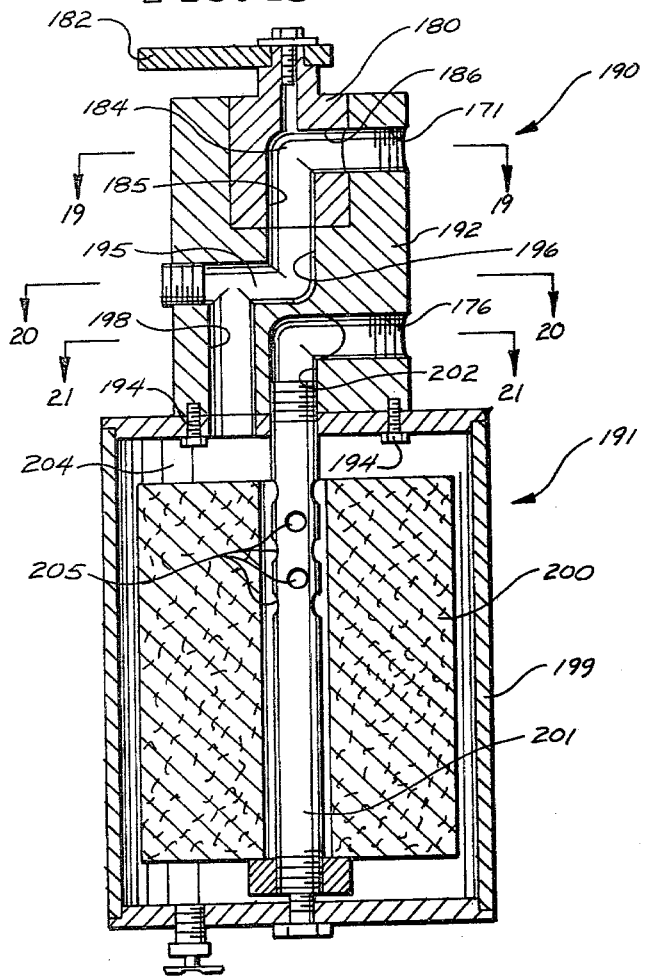
FIG. 18 is a vertical sectional view taken substantially along the line 18—18 in FIG. 17.
Figure 19:
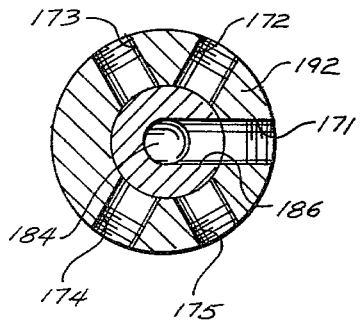
FIGS. 19, 20 and 21 are cross-sectional views taken substantially along the lines 19—19, 20—20, and 21—21, respectively, in FIG. 18.
Figure 20:
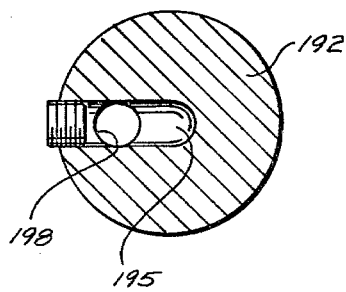
Figure 21:
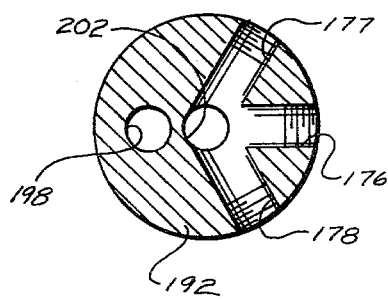

Referring next to FIGS. 17-21, there has been illustrated a fluid handling system wherein a valve 190—which is similar in construction and mode of operation to supply valve 144 depicted in FIGS. 12-15—is operatively connected to a fluid filtration system, generally indicated at 191, so as to permit filtration of the fluid being distributed to the plurality of utilization means (not shown in FIGS. 17-21, but such means might simply comprise a plurality of m diesel engines such as engines 152-153 shown in FIG. 12). Thus, as best illustrated in FIGS. 18 and 19, valve 190 is provided with a housing 192 which is secured to filtration system 191 by means of suitable threaded fasteners 194. Valve housing 192 is provided with a plurality of fluid inlet ports 171-175 and a plurality of fluid outlet ports 176-178 in a manner identical to that previously described in connection with the valve shown in FIGS. 13 and 14; and, further, is provided with an identical valve control element 180. However, in this instance, the axial flow path 185 in control element 180 does not communicate directly with the outlet ports 176-178; but, rather, communicates with a tortuous flow passage 195 formed in housing 192 having an axial branch 196 interconnected to a parallel, longitudinally extending, non-axial branch 198 which communicates directly with the interior of a housing 199 for filtration system 191.

As shown in FIG. 18, filtration housing 199 encloses a quantity of filter material 200 which surrounds a central filter outlet conduit 201 having its upper end coupled to an axial flow passage 202 formed in housing 190 and in fluid communication with fuel supply outlet ports 176–178. As fuel flows from the selected fuel source through the passages 184 and 195 formed in valve 190, it is introduced into the free space 204 between the filtration housing 199 and the filter medium 200. Such fuel is filtered by the filter material 200 and is discharged from the housing 199 through ports 205 formed in conduit 201, with the filtered fluid then being conveyed to all fluid utilization means via axial passage 202 in housing 192 and all supply outlet ports 176–178.

In accordance with yet another important aspect of the present invention, there has been provided a fluid handling and valving system, generally indicated at 206 in FIG. 22, which, although quite similar in construction and mode of operation to the system described above in connection with FIGS. 12–15, here permits fluid to be transferred both to and from different multiple utilization points from and to either one or more of a plurality of fluid sources. To accomplish this, the exemplary system 206 illustrated in FIGS. 22–25 includes a supply valve 207 having a housing 208 which has formed therein a first set of radial inlet ports 209, 210, 211; a second set of radial inlet ports 209', 210', 211'; a first set of radial outlet ports 212, 213; and, a second set of radial outlet ports 214, 215.

As the ensuing description proceeds, it will become apparent that the features of the present invention to be described in connection with FIGS. 22–25 are such that the fluid handling and valving system 206 may be used with any number of n fluid sources—e.g., fuel tanks—and m utilization means—e.g. engines. Although such sources and utilization means have not been shown in FIGS. 22–25, those skilled in the art will appreciate that they could, for example, take the form of fuel tanks and engines such as shown in FIGS. 1 (two tanks and two engines), 5 (three tanks and three engines), and 12 (five tanks and three engines). However, the exemplary system hereinbelow described is intended for use with three fuel sources (not shown) and four fuel utilization means (not shown). Consequently, and assuming valve 207 is intended as a supply valve, the four illustrative radial outlet ports 212–215 are adapted to be connected to respective different ones of four fluid utilization means for supplying fluid thereto, while the three radial inlet ports 209–211 are adapted to be connected to respective different ones of three fluid sources for receiving fluid therefrom. Radial inlet ports 209'–211' may if desired, also be coupled to respective ones of the three fluid sources but, since that would significantly increase the number of fittings and fluid supply lines required, provision is preferably made for plugging the radial outer extremities of the ports 209'–211' by means of suitable external threaded plugs such as indicated at 216 in FIG. 23, while connecting the radial inner ends of the ports 209'–211' to respective ones of the first set of inlet ports 209–211 by means of longitudinal passages 219, 220, 221 formed in housing 208.

As best indicated by reference to FIGS. 23 and 25 conjointly, outlet ports 212, 213 merge at the axis of valve housing 208 where they are coupled to an axial fluid path 222 formed in housing 208 and extending upwardly (as viewed in FIG. 23) from the plane of the radial inlet ports 212, 213. Similarly, outlet ports 214, 215 merge at their radial inner extremeties where they are connected to a second axial passage 224 formed in housing 208 and extending downwardly (as viewed in FIG. 23) from the plane of radial outlet ports 214, 215.

In order to control flow of fluid from a selected one or ones of the three fluid sources operatively connected to inlet ports 209–211, as well to control flow of fluid to the utilization means operatively connected to outlet ports 212–215, the illustrative system 206 is provided with a pair of independent coaxial control elements 225, 226 respectively having actuating levers 228, 229 affixed thereto—control element 225 being positioned to control the transfer of fluid from one of inlet ports 209–211 to both of outlet ports 212, 213, while control element 226 serves to control flow of fluid from one of inlet ports 209–211 to both of outlet ports 214, 215. To accomplish this, control element 225 is provided with an L-shaped flow passage 230 having an axial downwardly extending (as viewed in FIG. 23) leg 231 in fluid communicating registration with axial passage 222 in housing 208 at all operative positions of the control element, and a horizontal leg 232 positioned to be operatively associated on a selective basis with one only of the radial inlet ports 209–211. Similarly, control element 226 includes an L-shaped flow passage 234 formed therein having an upwardly extending axial leg 235 positioned to be operatively associated with passage 224 in valve housing 208 at all rotational positions of the control element 226, and a horizontal leg 236 positioned to be operatively associated with one only of the inlet ports 209'–211' and, therefore, by means of longitudinal passages 219–221, with one only of inlet ports 209–211.

In operation, and assuming the control elements 225, 226 to be positioned as shown in FIG. 23, fluid is supplied to inlet ports 209–211 from their respective sources (not shown) and, consequently, inlet ports 209–211 and their respective associated longitudinal passages 219–221 and the radial inner extremeties of inlet ports 209'–211' are charged with fluid at all times. However, since the horizontal legs 232, 236 of control elements 225, 226, respectively, are in fluid communication only with radial inlet port 211, fluid is permitted to flow only from that inlet port through passages 230, 222 to outlet ports 212, 213 and through passages 234, 224 to outlet ports 214, 215, while transmission of fluid from inlet ports 209 and 210 to any of the outlet ports is effectively blocked by the control elements 225, 226. As a consequence, all four utilization means operatively associated with outlet ports 212–215 receive fluid from only the fluid source operatively connected to inlet port 211.

Let it next be assumed that the operator desires to change the operating condition so that two of the four utilization means receive fluid from one source, while the other two utilization means receive fluid from a different source. To accomplish this, it is merely necessary for the operator to rotate one of the two control elements 225, 226 so as to align the horizontal leg of the flow path formed therein with a different one of the radial inlet ports 209–211. For example, assuming the operator were to rotate control element 225 by means of its actuating lever 228 so as to align the horizontal leg 232 therein with inlet port 210, then under these conditions fluid from the source operatively associated with inlet port 211 would be precluded from passing through passage 230 in control element 225, but would still flow freely through passage 221, the radial inner extremity of port 211', passages 234 and 224, and outwardly through outlet ports 214, 215 to the two utilization means operatively associated therewith. However, fluid from the source operatively associated with inlet port 210 would now be permitted to move through the L-shaped passage 230 in control element 225 and, thus, outwardly through outlet ports 212, 213 to the two utilization means operatively associated therewith. Fluid from inlet port 210 is still blocked by control element 226, whereas fluid from inlet port 209 is blocked by both control element 225 and control element 226. Consequently, the valve 207 now permits flow of the fluid from one of the three fluid sources to two of the four fluid utilization means and from a second of the three fluid sources to the other two fluid utilization means. Thus, as long as the control elements 225, 226 are positioned for fluid registration with the same inlet opening, all four utilization means are supplied by the same source. However, when the control elements are positioned so as to be registered with different inlet ports, two of the fluid utilization means receive fluid from one source, while the other two fluid utilization means receive fluid from a different source.

Those skilled in the art will readily appreciate that the valve illustrated and described in FIGS. 22–25 may function as either a supply valve or a return valve. Thus, when used as a return valve the ports 212–215 become return inlet ports while ports 209–211 become return outlet ports. Consequently, a return valve permits flow of fluid from all four utilization means to one of three fluid sources or, alternatively, from two of the four utilization means to one fluid source and from the other two utilization means to a different source.

Thus, there have herein been described various forms of fluid handling and valving systems which are highly versatile and characterized by their ability to deliver fluid from one of a plurality of sources to all of a plurality of utilization points or, alternatively, from one of a plurality of sources to some of a plurality of utilization points and from another of plurality of sources to the remainder of the plurality of utilization points; while, at the same time, permitting return of unused fluid from all of the utilization points to one of the sources (which may be either the supplying source or a different source) or, alternatively, from some of a plurality of utilization points to one of a plurality of sources and from the remainder of the plurality of utilization points to a different fluid source.

What is claimed is:

1. A fluid handling system for transferring fluids between n (where "n" is any whole integer greater than "1") fluid source means and m (where "m" is any whole integer greater than "1") fluid utilization means comprising, in combination:
   (a) valve housing means having n fluid source supply inlet ports, n fluid source return outlet ports, m fluid utilization supply outlet ports, and m fluid utilization return inlet ports;
   (b) means for connecting said n fluid source supply inlet ports and said n fluid source return outlet ports to respective different ones of said n fluid source means;
   (c) means for connecting said m fluid utilization supply outlet ports and said m fluid utilization return inlet ports to respective different ones of said m fluid utilization means;
   (d) selectively positionable valve control element means mounted in said valve housing means, said valve control element means having (i) fluid supply passageway means for selectively connecting one of said n fluid source supply inlet ports with said m fluid utilization supply outlet ports and (ii) fluid return passageway means for selectively connecting said m fluid utilization return inlet ports with one of said n fluid supply return outlet ports; and,
   (e) means for selectively positioning said valve control element means in any one of at least n positions wherein any one of said n fluid supply means is operatively connected to supply fluid to said m fluid utilization means and said m fluid utilization means are operatively connected to return fluid to any one of said n fluid supply means.

2. A fluid handling system as set forth in claim 1 wherein n and m are equal.

3. A fluid handling system as set forth in claim 1 wherein n is greater than m.

4. A fluid handling system as set forth in claim 1 wherein m is greater than n.

5. A fluid handling system as set forth in claim 1 wherein fluid is supplied to all of said m utilization means from one of said n fluid source means and unused fluid is returned from all of said m fluid utilization means to said one of said n fluid source means.

6. A fluid handling system as set forth in claim 1 wherein fluid is supplied to all of said m utilization means from one said n fluid source means and unused fluid is returned from all of said m fluid utilization means to a different one of said n fluid source means.

7. A fluid handling system as set forth in claim 1 wherein said valve housing means comprises a unitary valve housing and said control element means comprises a unitary control element extending through said housing with freedom for controlled rotation therein between positions selectively coupling (i) said fluid supply passageway means with different ones of said n inlet ports and with said m outlet ports, and (ii) said fluid return passageway means with said m inlet ports and different ones of said n outlet ports, so that upon rotation of said control element means from one position to another, fluid is supplied to said m utilization means from a different one of said n fluid source means, and fluid is returned from said m utilization means to a different one of said n fluid source means.

8. A fluid handling system as set forth in claim 1 wherein said valve housing means comprises a unitary valve housing and said control element means comprises a first control element defining said fluid supply passageway means and mounted in said housing with freedom for controlled rotation therein between positions selectively coupling said fluid supply passageway means with different ones of said n inlet ports and with said m outlet ports, and a second control element independent of said first control element and defining said fluid return passageway means and mounted in said housing with freedom for controlled rotation therein between positions selectively coupling said fluid return passageway means with said m inlet ports and with different ones of said n outlet ports, so that upon rotation of said first control element from one position to another fluid is supplied to said m utilization means from selected different ones of said n fluid source means, and upon rotation of said second control element from one position to another fluid is returned from said m utilization means to selected ones of said n fluid source means.

9. A fluid handling system as set forth in claim 1 wherein said valve housing means comprises a first supply valve housing having n fluid source supply inlet ports and m fluid utilization supply outlet ports, and a second return valve housing having m fluid utilization return inlet ports and n fluid source return outlet ports; and said valve control element means comprises first control element means defining said fluid supply passageway means and mounted in said first supply valve housing and second control element means defining said fluid return passageway means and mounted in said second return valve housing; whereby said first and second control element means may be selectively positioned independent of one another to permit fluid flow from any one of said n fluid source means to said m fluid utilization means and from said m fluid utilization means to any one of said n fluid source means.

10. A fluid handling system as set forth in claim 9 wherein said first control element means comprises a first control element defining first fluid supply passageway means for selectively coupling any one of said n fluid source means with certain only of said m fluid utilization means and a second control element defining second fluid supply passageway means for selectively coupling any one of said n fluid source means with the remainder of said m fluid utilization means.

11. A fluid handling system as set forth in claim 9 wherein said second control element means comprises a first control element defining first fluid return passageway means for selectively coupling certain only of said m fluid utilization means with any one of said n fluid source means and a second control element defining second fluid return passageway means for selectively coupling the remainder of said m fluid utilization means to any one of said n fluid source means.

12. A fluid handling system as set forth in claim 10 wherein said second control element means comprises a third control element defining first fluid return passageway means for selectively coupling certain only of said m fluid utilization means with any one of said n fluid source means and a fourth control element defining second fluid return passageway means for selectively coupling the remainder of said m fluid utilization means to any one of said n fluid source means.

13. A fluid handling system as set forth in claim 9 further characterized in that means for filtering fluid being supplied are operatively associated with said supply valve housing, and said first control element means includes means for diverting fluid from the one of said n inlet ports operatively associated in fluid supplying relationship therewith through said fluid filtering means, and means are provided for conducting all of the filtered fluid to said m utilization means.

14. A fuel supply system for transferring fuel between n (where "n" is any whole integer greater than "1") fuel storage tanks and m (where "m" is any whole integer greater than "1") engines comprising, in combination:
 (a) valve housing means having n supply inlet ports, n return outlet ports, m supply outlet ports, and m return inlet ports;
 (b) means for connecting said n supply inlet ports and said n return outlet ports to respective different ones of said n fuel storage tanks;
 (c) means for connecting said m supply outlet ports and said m return inlet ports to respective different ones of said m engines;
 (d) selectively positionable valve control element means mounted in said valve housing means, said valve control element means having (i) fuel supply passageway means for selectively connecting one of said n supply inlet ports with said m supply outlet ports and (ii) fuel return passageway means for selectively connecting said m return inlet ports with one of said n return outlet ports; and,
 (e) means for selectively positioning said valve control element means in any one of at least n positions wherein any one of said n fuel storage tanks is operatively connected to supply fuel to said m engines and said m engines are operatively connected to return unburned fuel to any one of said n fuel storage tanks.

15. A fuel supply system as set forth in claim 14 wherein said m engines are diesel engines having fuel injectors and wherein a portion of the fuel delivered to said engines is used to cool said fuel injectors, with such cooling fuel being returned to one of said n fuel storage tanks for subsequent supply to said m engines.

16. A fuel supply system as set forth in claim 14 wherein fuel is supplied to all of said m engines from one of said n fuel tanks and unburned fuel is returned from all of said m engines to said one of said n fuel tanks.

17. A fuel supply system as set forth in claim 14 wherein fuel is supplied to all of said m engines from one of said n fuel tanks and unburned fuel is returned from all of said m engines to a different one of said n fuel tanks.

18. A fuel supply system as set forth in claim 14 wherein said valve housing means comprises a unitary valve housing and said control element means comprises a unitary control element extending through said housing with freedom for controlled rotation therein between positions selectively coupling (i) said fuel supply passageway means with different ones of said n inlet ports and with said m outlet ports, and (ii) said fuel return passageway means with said m inlet ports and different one of said n outlet ports, so that upon rotation of said control element means from one position to another, fuel is supplied to said m engines from a different one of said n fuel tanks, and unburned fuel is returned from said m engines to a different one of said n fuel tanks.

19. A fuel supply system as set forth in claim 14 wherein said valve housing means comprises a unitary valve housing and said control element means comprises a first control element defining said fuel supply passageway means and mounted in said housing with feedom for controlled rotation therein between positions selectively coupling said fuel supply passageway means with different ones of said n inlet ports and with said m outlet ports, and a second control element independent of said first control element and defining said fuel return passageway means and mounted in said housing with freedom for controlled rotation therein between positions selectively coupling said fuel return passageway means with said m inlet ports and with different ones of said n outlet ports, so that upon rotation of said first control element from one position to another fuel is supplied to said m engines from selected different ones of said n fuel tanks, and upon rotation of said second control element from one position to another unburned fuel is returned from said m engines to selected ones of said n fuel tanks.

20. A fuel supply system as set forth in claim 14 wherein said valve housing means comprises a first supply valve housing having n supply inlet ports and m supply outlet ports, and a second return valve housing having m return inlet ports and n return outlet ports; and said valve control element means comprises first control element means defining said fuel supply passageway means and mounted in said first supply valve housing and second control element means defining said fuel return passageway means and mounted in said second return valve housing; whereby said first and second control element means may be selectively positioned independent of one another to permit fuel flow from any one of said n fuel tanks to said m engines and unburned fuel from said m engines to any one of said n fuel tanks.

21. A fuel supply system as set forth in claim 20 wherein said first control element means comprises a first control element defining first fuel supply passageway means for selectively coupling any one of said n fuel tanks with certain only of said m engines and a second control element defining second fuel supply passageway means for selectively coupling any one of said n fuel tanks with the remainder of said m engines.

22. A fuel supply system as set forth in claim 20 wherein said second control element means comprises a first control element defining first fuel return passageway means for selectively coupling certain only of said m engines with any one of said n fuel tanks and a second control element defining second fuel return passageway means for selectively coupling the remainder of said m engines to any one of said n fuel tanks.

23. A fuel supply system as set forth in claim 21 wherein said second control element means comprises a third control element defining first fuel return passageway means for selectively coupling certain only of said m engines with any one of said n fuel tanks and a fourth control element defining second fuel return passageway means for selectively coupling the remainder of said m engines to any one of said n fuel tanks.

24. A fuel supply system as set forth in claim 20 further characterized in that means for filtering fuel being supplied are operatively associated with said supply valve housing, and said first control element means includes means for diverting fuel from the one of said n inlet ports operatively associated in fuel supplying relationship therewith through said fluid filtering means, and means are provided for conducting all of the filtered fuel to said m engines.

25. A fluid control valve system comprising, in combination:
 (a) valve housing means having n (where "n" is any whole integer greater than "1") fluid source supply inlet ports adapted to be operatively connected to respective different ones of n fluid source means, n fluid source return outlet ports adapted to be operatively connected to respective different ones of n fluid source means, m (where "m" is any whole integer greater than "1") fluid utilization supply outlet ports adapted to be operatively connected to respective different ones of m fluid utilization means, and m fluid utilization return inlet ports adapted to be operatively connected to respective different ones of m fluid utilization means;
 (b) selectively positionable valve control element means mounted in said valve housing means, said valve control element means having (i) fluid supply passageway means for selectively connecting one of said n fluid source supply inlet ports with said m fluid utilization supply outlet ports and (ii) fluid return passageway means for selectively connecting said m fluid utilization return inlet ports with one of said n fluid supply return outlet ports; and,
 (c) means for selectively positioning said valve control element means in any one of at least n positions wherein any one of said n fluid source supply inlet ports is operatively connected to supply fluid to said m fluid utilization supply outlet ports and said m fluid utilization return inlet ports are operatively connected to return fluid to any one of said n fluid source return outlet ports.

26. A fluid control valve system as set forth in claim 25 wherein n and m are equal.

27. A fluid control valve system as set forth in claim 25 wherein n is greater than m.

28. A fluid control valve system as set forth in claim 25 wherein m is greater than n.

29. A fluid control valve system as set forth in claim 25 wherein fluid is supplied to all of said m fluid outlet ports from one of said n fluid inlet ports and unused fluid is returned from all of said m fluid inlet ports to said one of said n fluid outlet ports.

30. A fluid control valve system as set forth in claim 25 wherein fluid is supplied to all of said m fluid outlet ports from one of said n fluid inlet ports and unused fluid is returned from all of said m fluid inlet ports to a different one of said n fluid outlet ports.

31. A fluid control valve system as set forth in claim 25 wherein said valve housing means comprises a unitary valve housing and said control element means comprises a unitary control element extending through said housing with freedom for controlled rotation therein between positions selectively coupling (i) said fluid supply passageway means with different ones of said n inlet ports and with said m outlet ports, and (ii) said fluid return passageway means with said m inlet ports and different ones of said n outlet ports, so that upon rotation of said control element means from one position to another, fluid is supplied to said m outlet ports from a different one of said n inlet ports, and fluid is returned from said m inlet ports to a different one of said n outlet ports.

32. A fluid control valve system as set forth in claim 25 wherein said valve housing means comprises a unitary valve housing and said control element means comprises a first control element defining said fluid supply passageway means and mounted in said housing with freedom for controlled rotation therein between positions selectively coupling said fluid supply passageway means with different ones of said n inlet ports and with said m outlet ports, and a second control element independent of said first control element and defining said fluid return passageway means and mounted in said housing with freedom for controlled rotation therein between positions selectively coupling said fluid return passageway means with said m inlet ports and with different ones of said n outlet ports, so that upon rotation of said first control element from one position to another fluid is supplied to said m outlet ports from selected different ones of said n inlet ports, and upon rotation of said second control element from one position to another fluid is returned from said m inlet ports to selected ones of said n outlet ports.

33. A fluid control valve system as set forth in claim 25 wherein said valve housing means comprises a first supply valve housing having n fluid source supply inlet ports and m fluid utilization supply outlet ports, and a second return valve housing having m fluid utilization return inlet ports and n fluid source return outlet ports; and said valve control element means comprises first control element means defining said fluid supply passageway means and mounted in said first supply valve housing and second control element means defining said fluid return passageway means and mounted in said second return valve housing; whereby said first and second control element means may be selectively positioned independent of one another to permit fluid flow from any one of said n inlet ports to said m outlet ports and from said m inlet ports to any one of said n outlet ports.

34. A fluid control valve system as set forth in claim 33 wherein said first control element means comprises a first control element defining first fluid supply passageway means for selectively coupling any one of said n inlet ports with certain only of said m outlet ports and a second control element defining second fluid supply passageway means for selectively coupling any one of said n inlet ports with the remainder of said m outlet ports.

35. A fluid control valve system as set forth in claim 34 wherein said second control element means comprises a third control element defining first fluid return passageway means for selectively coupling certain only of said m inlet ports with any one of said n outlet ports and a fourth control element defining second fluid return passageway means for selectively coupling the remainder of said m inlet ports to any one of said n outlet ports.

36. A fluid control valve system as set forth in claim 33 wherein said second control element means comprises a first control element defining first fluid return passageway means for selectively coupling certain only of said m inlet ports with any one of said n outlet ports and second control element defining second fluid return passageway means for selectively coupling the remainder of said m inlet ports to any one of said n outlet ports.

37. A fluid control valve system as set forth in claim 33 further characterized in that means for filtering fluid being supplied are operatively associated with said supply valve housing, and said first control element means includes means for diverting fluid from the one of said n inlet ports operatively associated in fluid supplying relationship therewith through said fluid filtering means, and means are provided for conducting all of the filtered fluid to said m outlet ports.

* * * * *